United States Patent
Futamura (10) Patent No.: US 8,945,498 B2
(45) Date of Patent: Feb. 3, 2015

(54) METHOD FOR MANUFACTURING LITHIUM-CONTAINING COMPOSITE OXIDE

(75) Inventor: Tomoya Futamura, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 332 days.

(21) Appl. No.: 13/419,620

(22) Filed: Mar. 14, 2012

(65) Prior Publication Data

US 2012/0237426 A1  Sep. 20, 2012

(30) Foreign Application Priority Data

Mar. 18, 2011 (JP) ................................ 2011-060196

(51) Int. Cl.

| | | |
|---|---|---|
| C01B 15/16 | (2006.01) | |
| C01B 25/26 | (2006.01) | |
| B01J 27/00 | (2006.01) | |
| B01J 27/185 | (2006.01) | |
| H01M 4/00 | (2006.01) | |
| H01M 4/13 | (2010.01) | |
| H01M 4/50 | (2010.01) | |
| H01M 4/58 | (2010.01) | |
| H01M 4/88 | (2006.01) | |
| H01B 1/02 | (2006.01) | |

(Continued)

(52) U.S. Cl.
CPC ............. *C01B 25/45* (2013.01); *H01M 4/5825* (2013.01)
USPC ........... 423/306; 502/101; 502/208; 502/213; 429/221; 429/223; 429/224; 429/231.95; 252/182.1; 252/518.1; 252/521.2

(58) Field of Classification Search
USPC ........... 423/306; 502/101, 208, 213; 429/221, 429/223, 224, 231.95; 252/182.1, 518.1, 252/521.2
See application file for complete search history.

(56) References Cited

U.S. PATENT DOCUMENTS

| 6,913,855 B2 * | 7/2005 | Stoker et al. ............. 429/231.95 |
| 7,718,314 B2 | 5/2010 | Komiyama et al. |

(Continued)

FOREIGN PATENT DOCUMENTS

| JP | 11-025983 | 1/1999 |
| JP | 2004-079276 | 3/2004 |

(Continued)

OTHER PUBLICATIONS

"Hydrothermal synthesis of LiFePO4 with small particle size and its electrochemical properties," Akira Kuwahara et al. J. Electroceram (2010), 24, pp. 69-75.*

(Continued)

*Primary Examiner* — Patricia L Hailey
(74) *Attorney, Agent, or Firm* — Nixon Peabody LLP; Jeffrey L. Costellia (57) ABSTRACT

To simply manufacture a lithium-containing oxide at lower manufacturing cost. A method for manufacturing a lithium-containing composite oxide expressed by a general formula $LiMPO_4$ (M is one or more of Fe (II), Mn (II), Co (II), and Ni (II)). A solution containing Li and P is formed and then is dripped in a solution containing M (M is one or more of Fe (II), Mn (II), Co (II), and Ni (II)) to form a mixed solution. By a hydrothermal method using the mixed solution, a single crystal particle of a lithium-containing composite oxide expressed by the general formula $LiMPO_4$ (M is one or more of Fe (II), Mn (II), Co (II), and Ni (II)) is manufactured.

40 Claims, 8 Drawing Sheets

(51) Int. Cl.
*H01B 1/08* (2006.01)
*C01B 25/45* (2006.01)

(56) References Cited

U.S. PATENT DOCUMENTS

| | | | |
|---|---|---|---|
| 8,053,075 B2 * | 11/2011 | Schall et al. | 428/402 |
| 8,097,362 B2 * | 1/2012 | Isono | 429/221 |
| 8,133,616 B2 * | 3/2012 | Exnar et al. | 429/224 |
| 8,658,316 B2 * | 2/2014 | Kitagawa et al. | 429/232 |
| 8,663,847 B2 * | 3/2014 | Kashiwa et al. | 429/231.3 |
| 8,673,497 B2 * | 3/2014 | Hibst et al. | 429/221 |
| 2004/0096743 A1 | 5/2004 | Okae et al. | |
| 2008/0248382 A1 | 10/2008 | Sastry et al. | |
| 2008/0268339 A1 | 10/2008 | Suzuki | |
| 2009/0197174 A1 | 8/2009 | Levassbur et al. | |
| 2010/0163790 A1 | 7/2010 | Ceder et al. | |
| 2010/0202951 A1 * | 8/2010 | Wu et al. | 423/305 |
| 2010/0227221 A1 * | 9/2010 | Chang et al. | 429/231.95 |
| 2010/0279117 A1 * | 11/2010 | Gu | 428/402 |
| 2011/0195310 A1 | 8/2011 | Kawamoto et al. | |
| 2011/0223482 A1 * | 9/2011 | Fujii et al. | 429/221 |
| 2011/0274975 A1 * | 11/2011 | Kashiwa et al. | 429/221 |
| 2012/0028122 A1 * | 2/2012 | Kohmoto et al. | 429/221 |
| 2012/0100402 A1 * | 4/2012 | Nesper et al. | 429/48 |
| 2013/0047915 A1 * | 2/2013 | Miwa et al. | 117/71 |
| 2014/0087258 A1 * | 3/2014 | Kabe et al. | 429/220 |

FOREIGN PATENT DOCUMENTS

| | | | | |
|---|---|---|---|---|
| JP | 2006-252945 | | 9/2006 | |
| JP | 2007-103339 | | 4/2007 | |
| JP | 4767798 | | 9/2011 | |
| WO | WO 2006-027925 A2 | | 3/2006 | |
| WO | WO 2008-077447 A1 | | 7/2008 | |
| WO | 2010/082402 | * | 7/2010 | H01M 4/58 |
| WO | 10-2315450 | * | 1/2012 | H01M 4/58 |

OTHER PUBLICATIONS

Kang et al., "Battery Materials for Ultrafast Charging and Discharging", Nature, vol. 458, No. 12, Mar. 12, 2009, pp. 190-193.

Zhou ct al., "The Li Intercalation Potential of $LiMPO_4$ and $LiMSiO_4$ Olivincs with M = Fe, Mn, Co, Ni", Electrochemistry Communications, Nov. 1, 2004, vol. 6, No. 11, pp. 1144-1148.

Yang et al., "Hydrothermal Synthesis of Lithium Iron Phosphate Cathodes", Electrochemistry Communications, 2001, vol. 3, No. 9, pp. 505-508.

Liang et al., "Anisotropy in Magnetic Properties and Electronic Structure of Single-Crystal $LiFePO_4$", Physical Review B, 2008, vol. 77, pp. 064414-1-064414-12.

Tannai et al., "Optimization of Hydrothermal Synthesis Process and Evaluation of $LiFePO_4$ Cathode for Rechargeable Lithium Batteries", The $48^{th}$ Battery Symposium in Japan, Nov. 13, 2007, pp. 66-67.

Dokko et al., "Electrochemeical Properties of $LiFePO_4$ Prepared via Hydrothermal Route", Journal of Power Sources, Mar. 20, 2007, vol. 165, No. 2, pp. 656-659.

* cited by examiner

METHOD FOR MANUFACTURING LITHIUM-CONTAINING COMPOSITE OXIDE

BACKGROUND OF THE INVENTION

1. Field of the Invention

The present invention relates to a method for manufacturing a lithium-containing composite oxide. The present invention also relates to a lithium-ion secondary battery including an electrode in which a lithium-containing composite oxide is used as an active material.

2. Description of the Related Art

In recent years, lithium-ion secondary batteries have been developed. Because of their high thermal stability, lithium-containing composite oxides having olivine structures, such as $LiFePO_4$, $LiMnPO_4$, $LiCoPO_4$, and $LiNiPO_4$, have been expected as positive electrode active materials of lithium-ion secondary batteries. Such a lithium-containing composite oxide having an olivine structure contains a bivalent transition metal element (e.g., Fe, Mn, Co, and Ni).

As a method for manufacturing lithium-containing composite oxides having olivine structures, a solid phase method, a hydrothermal method, a sol-gel method, or the like is employed (e.g., Patent Document 1).

In order to increase the discharge capacity and the energy density of lithium-ion secondary batteries, attempts have been made to reduce the particle diameters and variation in particle size of active materials included in an active material layer that relates to intercalation and deintercalation of ions functioning as carriers. A hydrothermal method has been used as a method for manufacturing lithium-containing composite oxides with less variation in particle size and small particle diameters. In a hydrothermal method, a solution obtained by dissolving raw materials of a source of lithium, a source of a bivalent transition metal element, and a source of phosphorus in water is put into a heat-resistant container and heated to a predetermined temperature so that synthetic reaction is caused.

REFERENCE

[Patent Document 1] PCT International Publication No. 08/077447

SUMMARY OF THE INVENTION

However, when a solution of a source of a bivalent transition metal element (M (II)) reacts with a liquid containing a hydroxyl group, a hydroxide of the bivalent transition metal element $(M(II)(OH)_2)$ is formed. Exposure of the hydroxide of the bivalent transition metal element to oxygen easily causes oxidation of the transition metal element, so that a transition metal element in the hydroxide of the bivalent transition metal element becomes a transition metal element with a valence of three or more. Thus, by-products of lithium-containing composite oxides manufactured by a hydrothermal method might be obtained. That is why a solution of a source of a bivalent transition metal element needs to be adjusted not in an air atmosphere but in a deoxidized atmosphere, which requires large-scale equipment.

In view of the above problems, one embodiment of the present invention is to provide a method for manufacturing a lithium-containing oxide, which is simple and allows reduction in manufacturing cost.

One embodiment of the present invention is a method for manufacturing a lithium-containing composite oxide expressed by a general formula $LiMPO_4$ (M is one or more of Fe (II), Mn (II), Co (II), and Ni (II)). The method is as follows. A solution containing Li and P is formed and then is dripped in a solution containing M (M is one or more of Fe (II), Mn (II), Co (II), and Ni (II)) to form a mixed solution. By a hydrothermal method using the mixed solution, a single crystal particle of a lithium-containing composite oxide expressed by the general formula $LiMPO_4$ (M is one or more of Fe (II), Mn (II), Co (II), and Ni (II)) is manufactured.

According to one embodiment of the present invention, a single crystal particle of a lithium-containing composite oxide is manufactured as follows. A first solution in which a lithium compound is dissolved and a second solution in which a phosphorus compound is dissolved are mixed to form a first mixed solution. The first mixed solution is dripped in a third solution in which one or more of an iron (II) compound, a manganese (II) compound, a cobalt (II) compound, and a nickel (II) compound are dissolved, so that a second mixed solution is formed. Then, the second mixed solution is heated by a hydrothermal method. Thus, a single crystal particle of a lithium-containing composite oxide is manufactured.

The concentrations of the solution containing Li and P, the solution containing M, the first solution, the second solution, and the third solution are controlled so that the pH of the first mixed solution or the second mixed solution becomes 6 to 8, preferably 7.

The lithium-containing composite oxide is a flat single crystal particle and has an olivine structure. In the single crystal particle, the length in the b-axis direction is shorter than each of the lengths in the a-axis direction and the c-axis direction and is longer than or equal to 5 nm and shorter than or equal to 50 nm.

The solution containing Li and P is alkaline. When the solution containing Li and P is dripped in the solution containing M, the reaction (that is, neutralization reaction) between a hydrogen ion included in the solution containing M, and a hydroxyl ion included in the solution containing Li and P is prior to the reaction between one or more of an Fe (H) ion, a Mn (II) ion, a Co (II) ion, and a Ni (II) ion, which are included in the solution containing M, and a hydroxyl ion included in the solution containing Li and P. Thus, it is possible to suppress formation of a hydroxide of a transition metal element. Consequently, the mixed solution containing Li, P, and M can be adjusted in an air atmosphere. Further, by a hydrothermal method using the mixed solution containing Li, P, and M, an olivine-type lithium-containing composite oxide can be manufactured.

According to one embodiment of the present invention, a single crystal particle of a lithium-containing composite oxide can be manufactured while the amount of a by-product can be reduced. Further, the single crystal particle of the lithium-containing composite oxide can be manufactured in an air atmosphere.

DETAILED DESCRIPTION OF THE INVENTION

Embodiments and an example of the present invention will be described with reference to the drawings. Note that the present invention is not limited to the following description, and it will be easily understood by those skilled in the art that various changes and modifications can be made without departing from the spirit and the scope of the present invention. Thus, the present invention should not be construed as being limited to the following description of the embodiments and the example. In description with reference to the drawings, in some cases, common reference numerals are used to denote the same portions in different drawings. Further, in some cases, the same hatching patterns are applied to similar portions, and the similar portions are not necessarily designated by reference numerals.

Embodiment 1

In this embodiment, a method for manufacturing a lithium-containing composite oxide, according to one embodiment of the present invention, will be described with reference to FIG. 1.

In a step S201*a*, a lithium compound is weighed. In a step S201*b*, a phosphorus compound is weighed. In a step S201*c*, one or more of an iron (II) compound, a manganese (II) compound, a cobalt (II) compound, and a nickel (II) compound (hereinafter referred to as an M (II) compound) are weighed. Here, the compounds are weighed so that the 0.01 of a mixed solution B containing the lithium compound, the phosphorus compound, and the M (II) compound, which is to be formed, becomes greater than or equal to 6 and less than or equal to 8, preferably 7, in the steps S201*a* to S201*c*.

Typical examples of the lithium compound are lithium hydroxide-hydrate ($LiOH \cdot H_2O$), lithium chloride (LiCl), lithium carbonate ($Li_2CO_3$), lithium acetate ($LiCH_3COO$), and lithium oxalate (($COOLi)_2$).

Typical examples of the phosphorus compound are a phosphoric acid such as orthophosphoric acid ($H_3PO_4$), and ammonium hydrogenphosphates such as diammonium hydrogenphosphate (($NH_4)_2HPO_4$) and ammonium dihydrogenphosphate ($NH_4H_2PO_4$).

Typical examples of the iron (II) compound are iron chloride ($FeCl_2$), iron sulfate heptahydrate ($FeSO_4 \cdot 7H_2O$), and iron acetate ($Fe(CH_3COO)_2$).

Typical examples of the manganese (II) compound are manganese chloride tetrahydrate ($MnCl_2 \cdot 4H_2O$), manganese sulfate-hydrate ($MnSO_4 \cdot H_2O$), and manganese acetate tetrahydrate ($Mn(CH_3COO)_2 \cdot 4H_2O$).

Typical examples of the cobalt (II) compound are cobalt chloride hexahydrate ($CoCl_2 \cdot 6H_2O$), cobalt sulfate ($CoSO_4$), and cobalt acetate tetrahydrate ($Co(CH_3COO)_2 \cdot 4H_2O$).

Typical examples of the nickel (II) compound are nickel chloride hexahydrate ($NiCl_2 \cdot 6H_2O$), nickel sulfate hexahydrate ($NiSO_4 \cdot 6H_2O$), and nickel acetate tetrahydrate ($Ni(CH_3COO)_2 \cdot 4H_2O$).

In a step S203*a*, the lithium compound is dissolved in a solvent to form a solution containing lithium. Similarly, in a step S203*b* and a step S203*c*, the phosphorus compound and the M (II) compound are dissolved in solvent's to form a solution containing phosphorus and a solution containing M (II), respectively.

As the solvents in which the lithium compound, the phosphorus compound, and the M (II) compound are dissolved, water is given.

In a step S205, the lithium-containing solution formed in the step S203*a* and the phosphorus-containing solution formed in the step S203*b* are mixed to form a mixed solution A. Since the lithium-containing solution and the phosphorus-containing solution are alkaline and acid, respectively, a neutralization reaction is caused so that the mixed solution A is made slightly alkaline in the step S205. Depending on the concentrations of the lithium-containing solution and the phosphorus-containing solution, a precipitate may be formed in the mixed solution A.

Note that instead of the mixed solution A, a solution containing lithium and phosphorus may be formed by dissolving a lithium salt such as $LiPO_4$, $Li_2PO_4$, or $LiH_2PO_4$ in a solvent such as water.

In a step S207, the mixed solution A formed in the step S205 and the M (II)-containing solution formed in the step S203*c* are mixed to form the mixed solution B.

In the step S207, it is preferable to drip the mixed solution A little by little while stirring the M (II)-containing solution.

The mixed solution A is slightly alkaline. Thus, if the M (II)-containing solution is dripped in the mixed solution A, M (II) in the M (II)-containing solution and a hydroxyl group in the mixed solution A react with each other, so that an M (II) hydroxide is formed. This is because the amount of the mixed solution A is larger than that of the M (II)-containing solution.

In contrast, when the mixed solution A is dripped in the M (II)-containing solution little by little, the neutralization reaction between hydrogen contained in the M (II)-containing solution and the hydroxyl group contained in the mixed solution A is prior to the reaction between M (II) and the hydroxyl group contained in the mixed solution A, because the amount of the mixed solution A is smaller than that of the M (II)-containing solution. Consequently, formation of an M (II) hydroxide typified by an iron (II) hydroxide, a manganese (II) hydroxide, or a nickel (II) hydroxide can be suppressed. That is to say, it is possible to form the mixed solution B containing Li, P, and M (M is one or more of Fe (II), Mn (II), Co (II), and Ni (II)) in an air atmosphere.

Further, the step S207 is preferably performed at a temperature in the range of a room temperature to 50° C. If the step S207 is performed at a temperature higher than 50° C., e.g., at 80° C., the pH of the mixed solution A is changed so that the mixed solution A is made acidic. Accordingly, the mixed solution B has acidity. When a hydrothermal method is performed with the use of the mixed solution B, the thickness in the b-axis direction of a single crystal particle is increased and thus the single crystal particle is not flat, which is unfavorable. On the other hand, when the mixed solution B has a high pH and alkalinity, the particle of the lithium-containing composite oxide to be synthesized is fine; thus, a flat single crystal particle is not formed, which is also unfavorable.

In a step S209, the mixed solution B is put in a container resistant to heat and pressure such as an autoclave, heated at 100° C. to 350° C. inclusive and at 0.1 MPa to 100 MPa inclusive, for 0.5 hours to 24 hours inclusive, and then cooled. After that, the resultant solution in the container resistant to heat and pressure is filtrated, washed with water, and dried.

As a result, an olivine-type lithium-containing composite oxide ($LiMPO_4$ (M is one or more of Fe (II), Mn (II), Co (II), and Ni (II)) can be formed as a compound A with high yield. As the lithium-containing composite oxide, $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b \leq 1$, $0 < a < 1$, $0 < b < 1$), $LiFe_cNi_dCo_ePO_4$, $LiFe_cNi_dMn_ePO_4$, $LiNi_cCo_dM$-

$n_ePO_4$ (c+d+e≤1, 0<c<1, 0<d<1, 0<e<1), $LiFe_fNi_gCo_hMn_iPO_4$ (f+g+h+i≤1, 0<f<1, 0<g<1, 0<h<1, 0<i<1), or the like can be obtained as appropriate depending on the amount of the M (II) compound. The lithium-containing composite oxide obtained in this embodiment is a flat single crystal particle.

Here, the shape of the lithium-containing composite oxide obtained by the manufacturing method shown in FIG. 1 will be described.

Figure 1:
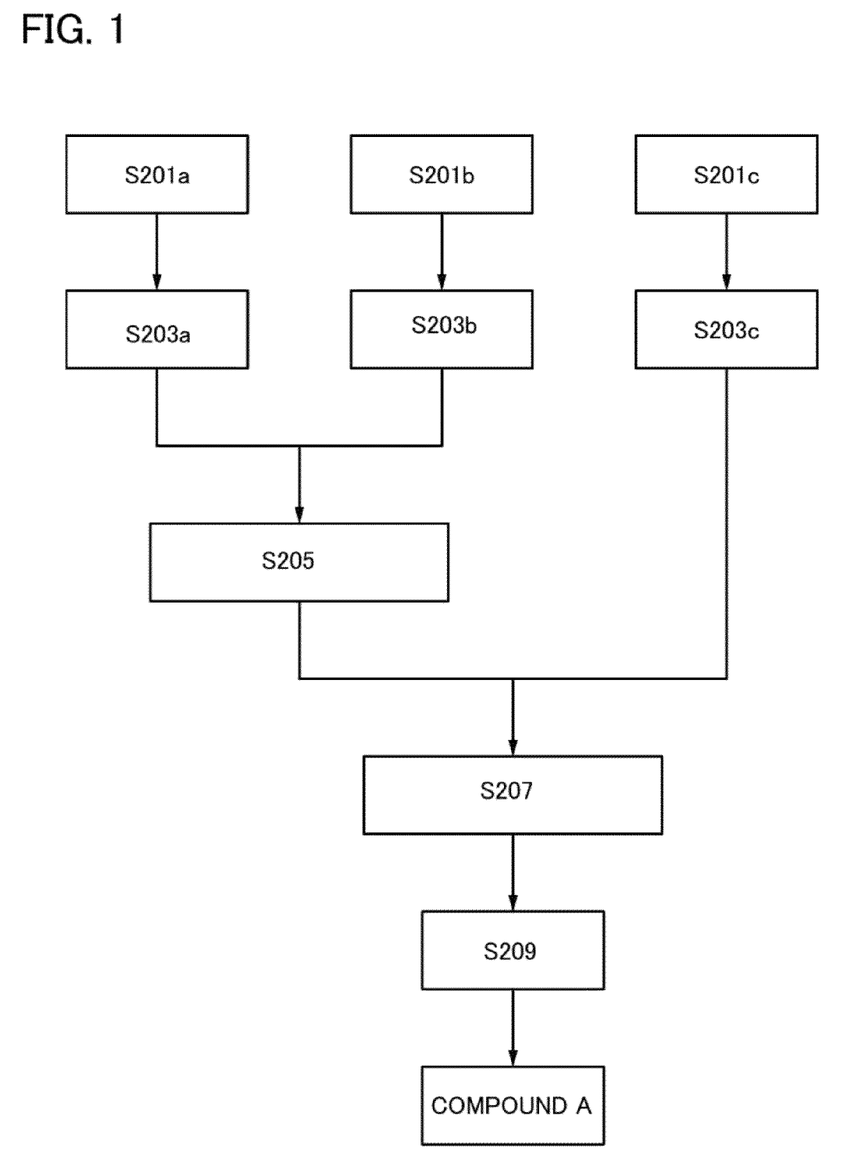
FIG. 1 shows a method for manufacturing a lithium-containing composite oxide.
Figure 2A:
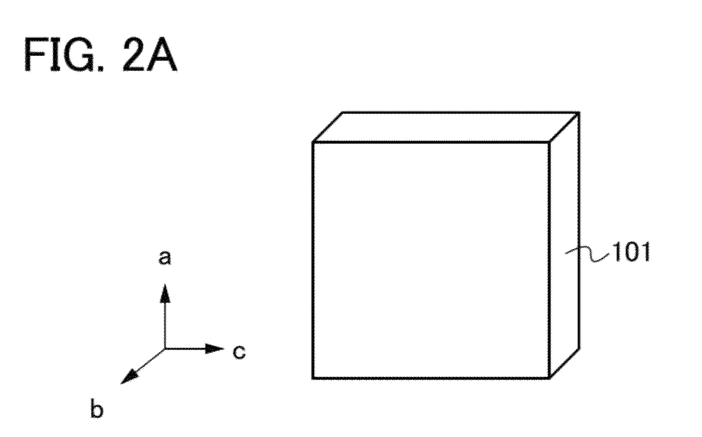
FIGS. 2A and 2B illustrate lithium-containing composite oxides.

FIGS. 2A and 2B are perspective views of olivine-type lithium-containing composite oxides obtained by the manufacturing method shown in FIG. 1. FIG. 2A illustrates a single crystal particle of a lithium-containing composite oxide 101 having a rectangular-solid shape. The lithium-containing composite oxide 101 is a flat shape where the length of the side in the b-axis direction is shorter than each of the lengths of the sides in the a-axis direction and the c-axis direction. The length in the b-axis direction is longer than or equal to 5 nm and shorter than or equal to 50 nm, preferably longer than or equal to 5 nm and shorter than or equal to 20 nm. The ratio of the lengths in the a-axis direction and the c-axis direction is greater than or equal to 0.5 and less than or equal to 1.5, preferably greater than or equal to 0.8 and less than or equal to 1.2. In other words, the b-plane has a square shape or a substantially square shape.

Figure 2B:
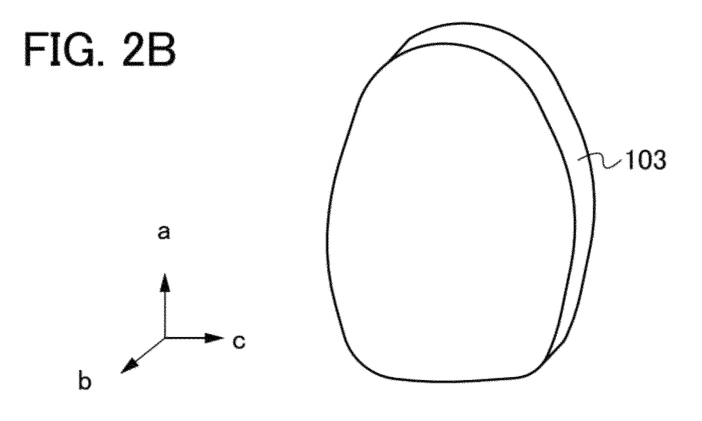

FIG. 2B illustrates a lithium-containing composite oxide 103 having the b-plane of a given shape and a side in the b-axis direction with a length of 5 nm to 50 nm inclusive, preferably 5 nm to 20 nm inclusive.

Note that it can be judged using more than one of a scanning electron microscope (SEM), a scanning transmission electron microscope (STEM), a transmission electron microscope (TEM), and X-ray diffraction (XRD) that the lithium-containing composite oxide 103 is a flat crystal in which the length of the side in the b-axis direction is shorter than each of the lengths of the sides in the a-axis direction and the c-axis direction. For example, the lithium-containing composite oxide 103 is judged as a single crystal particle because the contrast of a dark-field image observed with a transmission electron microscope (TEM) is uniform and thus grain boundaries are not seen in the dark-field image.

Figure 3:
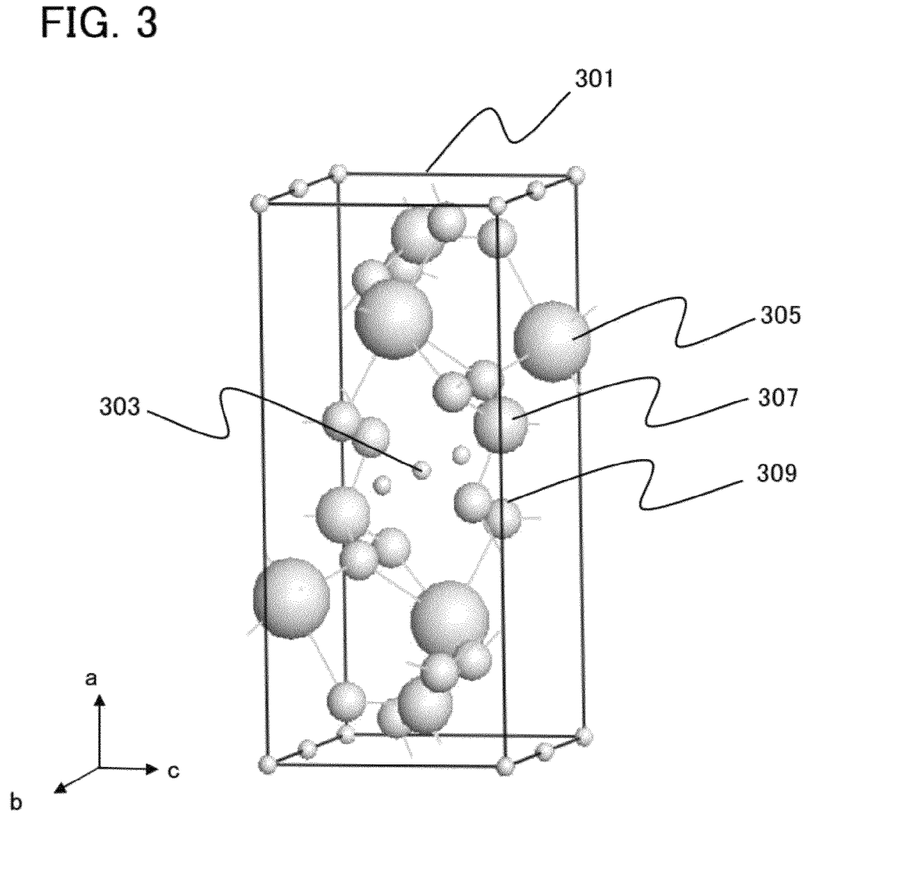
FIG. 3 illustrates a crystal; structure of olivine-type $LiFePO_4$.

Here, description is given of an olivine structure. FIG. 3 illustrates a unit cell 301 of lithium iron phosphate ($LiFePO_4$) that is an example of an olivine-type lithium-containing composite oxide. An olivine-type lithium iron phosphate has an orthorhombic crystal structure and includes four formula units of lithium iron phosphate ($LiFePO_4$) within a unit cell. The basic framework of the olivine structure is a hexagonal closest packed structure of oxide ions, in which lithium, iron, and phosphorus are located in gaps of the closest packed structure.

Further, the olivine-type lithium iron phosphate ($LiFePO_4$) has a tetrahedral site and two kinds of Octahedral sites. The tetrahedral site has four oxygen atoms in the vertices. The octahedral sites have six oxygen atoms in the vertices. Phosphorus 307 is located at the center of the tetrahedral site, and lithium 303 or iron 305 is located at the center of the octahedral site. The octahedral site with the lithium 303 located at the center is referred to as an M1 site, and the octahedral site with the iron 305 located at the center is referred to as an M2 site. The M1 site is disposed one-dimensionally in the b-axis direction. In other words, the lithium 303 is disposed one-dimensionally in the <010> direction. Note that for sake of simplicity, the bonds between the lithium 303 and other ions or atoms are not shown by lines.

The irons 305 of neighboring M2 sites are bonded in a zigzag manner with oxygen 309 interposed therebetween. The oxygen 309 bonded between the irons 305 of the neighboring M2 sites is also bonded to the phosphorus 307 of the tetrahedral site. Thus, the bonds of iron-oxygen-phosphorus are serially linked.

Note that the olivine-type lithium iron phosphate may be distorted. Furthermore, regarding the lithium iron phosphate, the composition ratio of lithium, iron, phosphorus, and oxygen is not limited to 1:1:1:4. Also, as the transition metal (M) of a lithium transition metal phosphate ($LiMPO_4$), a transition metal which has a larger ionic radius than a lithium ion, such as manganese, cobalt, or nickel, may be used.

When lithium is deintercalated from the olivine-type lithium iron phosphate in FIG. 3, iron phosphate is left, and this iron phosphate has a stable structure. Thus, intercalation and deintercalation of all lithium ions are possible. Further, the olivine-type lithium iron phosphate, has thermal stability. In the olivine-type lithium iron phosphate, lithium ions are unidimensionally arranged in the b-axis direction and diffused in the b-axis direction. For this reason, when the length of the side in the b-axis direction of the single crystal particle is short, the lithium ions can be easily diffused.

As in the case of the lithium-containing composite oxide according to this embodiment, when the length of a side in the b-axis direction in which lithium ions migrate is 5 nm to 50 nm inclusive, preferably 5 nm to 20 nm inclusive, the migration distance of the lithium ions which contribute to electric conduction is short. Therefore, the use of the lithium-containing composite oxide according to this embodiment for a positive electrode active material in a lithium-ion secondary battery allows reduction in internal resistance of the lithium-ion secondary battery, so that the lithium-ion secondary battery can have higher power and the discharge capacity thereof can be as high as theoretical discharge capacity.

According to this embodiment, lithium-containing composite oxides can be manufactured with high yield by a simple method.

Embodiment 2

In this embodiment, a lithium-ion secondary battery and a manufacturing method thereof will be described.

Figure 4:
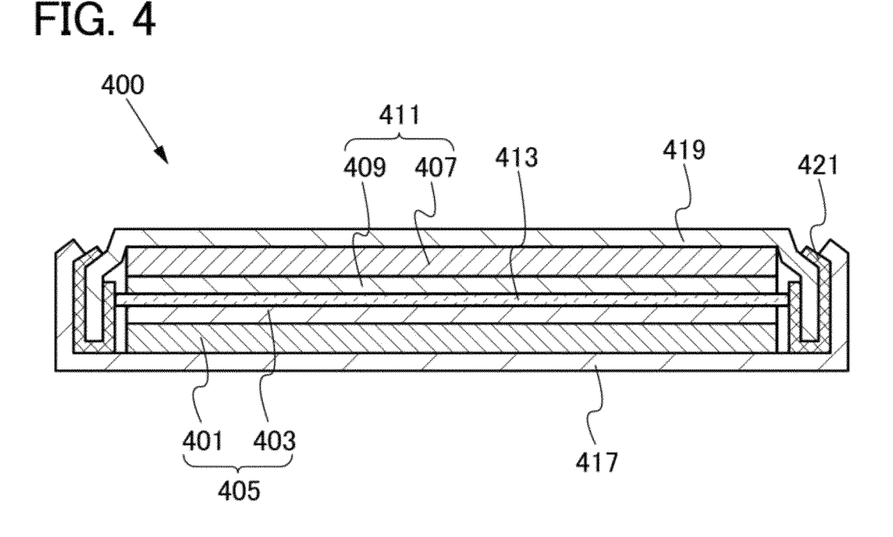
FIG. 4 illustrates a lithium-ion secondary battery.

A lithium-ion secondary battery according to this embodiment will be described with reference to FIG. 4. Here, a cross-sectional structure of the lithium-ion secondary battery will be described below.

A lithium-ion secondary battery 400 includes a negative electrode 411 including a negative electrode current collector 407 and a negative electrode active material layer 409, a positive electrode 405 including a positive electrode current collector 401 and, a positive electrode active material layer 403, and a separator 413 provided between the negative electrode 411 and the positive electrode 405. Note that the separator 413 is impregnated with an electrolyte. The negative electrode current collector 407 is connected to an external terminal 419 and the positive electrode current collector 401 is connected to an external terminal 417. An end portion of the external terminal 419 is embedded in a gasket 421. That is to say, the external terminals 417 and 419 are insulated from each other by the gasket 421.

Note that an electrolyte, in this specification means the one which includes a material in which lithium ions stably exist and with which lithium ions functioning as carrier ions can be transferred. The electrolyte includes in its category an electrolyte solution obtained by dissolving, in a solvent, a material (solute) in which lithium ions stably exist, and a solid electrolyte including a material (solute) in which lithium ions stably exist, for example.

Note that the active material refers to a material that relates to intercalation and deintercalation of ions which function as carriers and does not include a carbon layer or the like. When an electrode such as a positive electrode or a negative electrode is formed by a coating method to be described later, an active material layer is formed over the current collector with the use of a mixture of an active material over which a carbon layer is formed and other materials such as a conduction auxiliary agent, a binder, and a solvent. Thus, the active material and the active material layer are distinguished.

For the negative electrode current collector 407, a material having high conductivity such as copper, stainless steel, iron, or nickel can be used. The negative electrode current collector 407 can have a foil shape, a plate shape, a net shape, or the like as appropriate.

The negative electrode active material layer 409 is formed using a material capable of lithium-ion occlusion and emission. Typically, lithium, aluminum, graphite, silicon, tin, germanium, or the like is used. Note that it is possible to omit the negative electrode current collector 407 and use the negative electrode active material layer 409 alone for a negative electrode. The theoretical lithium occlusion capacity is larger in germanium, silicon, lithium, and aluminum than in graphite. When the occlusion capacity is large, charge and discharge can be performed sufficiently even in a small area and a function of a negative electrode can be obtained, so that reduction in cost and size of a secondary battery can be achieved. However, in the case of silicon or the like, the volume is approximately quadrupled due to lithium occlusion; therefore, the probability that the material itself gets vulnerable should be considered.

Note that the negative electrode active material layer 409 may be predoped with lithium. Predoping with lithium may be performed in such a manner that a lithium layer is formed on a surface of the negative electrode active material layer 409 by a sputtering method. Alternatively, lithium foil is provided on the surface of the negative electrode active material layer 409, whereby the negative electrode active material layer 409 can be predoped with lithium.

The desired thickness of the negative electrode active material layer 409 is determined in the range of 20 µm to 100 µm.

Note that the negative electrode active material layer 409 may include a binder and a conduction auxiliary agent.

As the binder, polysaccharides such as starch, carboxymethyl cellulose, hydroxypropyl cellulose, regenerated cellulose, and diacetyl cellulose; vinyl polymers such as polyvinyl chloride, polyethylene, polypropylene, polyvinyl alcohol, polyvinyl pyrrolidone, polytetrafluoroethylene, polyvinylide fluoride, ethylene-propylene-diene monomer (EPDM) rubber, sulfonated EPDM rubber, styrene-butadiene rubber, butadiene rubber, and fluorine rubber; polyether such as polyethylene oxide; and the like can be given.

As the conduction auxiliary agent, a material which is itself an electron conductor and does not cause chemical reaction with other materials in the lithium-ion secondary battery may be used. For example, carbon-based materials such as graphite, carbon fiber, carbon black, acetylene black, and VGCF (registered trademark); metal materials such as copper, nickel, aluminum, and silver; and powder, fiber, and the like of mixtures thereof can be given. The conduction auxiliary agent is a material that assists conductivity between active materials; it is provided between active materials which are apart from each other and makes conduction between the active materials.

As the positive electrode current collector 401, a material having high conductivity such as platinum, aluminum, copper, titanium, or stainless steel can be used. The positive electrode current collector 401 can have a foil shape, a plate shape, a net shape, or the like as appropriate.

For the positive electrode active material layer 403, the lithium-containing composite oxide obtained in Embodiment 1 can be used as appropriate. A surface of the lithium-containing composite oxide may be covered with a carbon layer with a thickness of less than or equal to 10 nm, preferably greater than or equal to 1 nm and less than or equal to 10 nm.

The desired thickness of the positive electrode active material layer 403 is determined in the range of 20 µm to 100 µm. It is preferable to adjust the thickness of the positive electrode active material layer 403 as appropriate so that a crack and separation are not caused.

Further, the positive electrode active material layer 403 may include a binder and a conduction auxiliary agent similarly to the negative electrode active material layer 409. As the binder and the conduction auxiliary agent, any of those listed for the negative electrode active material layer 409 can be used as appropriate.

As the separator 413, an insulating porous material is used. Typical examples of the separator 413 include cellulose (paper), polyethylene, polypropylene, and the like.

As a solute of the electrolyte, a material in which lithium ions that are carrier ions can transfer and exist stably is used. Typical examples of the solute of the electrolyte include lithium salts such as $LiClO_4$, $LiAsF_6$, $LiBF_4$, $LiPF_6$, and $Li(C_2F_5SO_2)_2N$.

As the solvent of the electrolyte, a material in which lithium ions can transfer is used. As the solvent of the electrolyte, an aprotic organic solvent is preferably used. Typical examples of aprotic organic solvents include ethylene carbonate, propylene carbonate, dimethyl carbonate, diethyl carbonate, γ-butyrolactone, acetonitrile, dimethoxyethane, tetrahydrofuran, and the like, and one or more of these materials can be used. When a gelled high-molecular material is used as the solvent of the electrolyte, safety against liquid leakage and the like is improved. Further, the lithium-ion secondary battery 400 can be thinner and more lightweight. Typical examples of gelled high-molecular materials include a silicon gel, an acrylic gel, an acrylonitrile gel, polyethylene oxide, polypropylene oxide, a fluorine-based polymer, and the like.

As the electrolyte, a solid electrolyte such as $Li_3PO_4$ can be used. Note that in the case of using such a solid electrolyte as the electrolyte, the separator 413 is unnecessary.

For the external terminals 417 and 419, a metal member such as a stainless steel plate or an aluminum plate can be used as appropriate.

Note that in this embodiment, a coin-type lithium-ion secondary battery is given as the lithium-ion secondary battery 400; however, any of lithium-ion secondary batteries with various shapes, such as a sealing-type lithium-ion secondary battery, a cylindrical lithium-ion secondary battery, and a square-type lithium-ion secondary battery, can be used. Further, a structure in which a plurality of positive electrodes, a plurality of negative electrodes, and a plurality of separators are stacked or rolled may be employed.

A lithium-ion secondary battery has a high energy density, a large capacity, and a high output voltage, which enables reduction in size and weight. Further, the lithium-ion secondary battery does not easily deteriorate due to repetitive charge and discharge and can be used for a long time, so that cost can be reduced. When an olivine-type lithium-containing composite oxide which is a flat single crystal particle whose side in the b-axis direction is longer than or equal to 5 nm and shorter than or equal to 50 nm, preferably longer than or equal to 5 nm and shorter than or equal to 20 nm is used for the positive electrode active material layer, the lithium-ion secondary battery can have higher discharge capacity and higher power.

Next, a method for manufacturing the lithium-ion secondary battery 400 according to this embodiment will be described.

First, a method for forming the negative electrode 411 will be described.

The negative electrode active material layer 409 is formed over the negative electrode current collector 407 by a coating method, a sputtering method, an evaporation method, or the like, whereby the negative electrode 411 can be formed. Alternatively, for the negative electrode 411, foil, a plate, or mesh of lithium, aluminum, graphite, or silicon can be used. Here, graphite is predoped with lithium to form the negative electrode.

Next, a method for forming the positive electrode 405 will be described.

Slurry containing the lithium-containing composite oxides is applied to the positive electrode current collector 401 by a coating method or the like and then dried to form the positive electrode active material layer 403; thus, the positive electrode can be formed.

Lithium-containing composite oxides with small particle diameters are likely to agglomerate and difficult to disperse uniformly in the slurry. For this reason, a dispersant and a disperse medium are preferably used as appropriate to disperse the lithium-containing composite oxides uniformly in the slurry.

Next, the negative electrode 411, the separator 413, and the positive electrode 405 are impregnated with the electrolyte. Then, the positive electrode 405, the separator 413, the gasket 421, the negative electrode 411, and the external terminal 419 are stacked in this order over the external terminal 417, and the external terminal 417 and the external terminal 419 are crimped to each other with a "coin cell crimper". Thus, the coin-type lithium-ion secondary battery can be manufactured.

Note that a spacer and a washer may be provided between the external terminal 417 and the positive electrode 405 or between the external terminal 419 and the negative electrode 411 so that the connection between the external terminal 417 and the positive electrode 405 or between the external terminal 419 and the negative electrode 411 is enhanced.

Embodiment 3

In this embodiment, an application of the lithium-ion secondary battery described in Embodiment 2 will be described with reference to FIGS. 5A and 5B.

The lithium-ion secondary battery described in Embodiment 2 can be provided in electronic devices, e.g., cameras such as digital cameras or video cameras, digital photo frames, mobile phones (also referred to as cellular phones or cellular phone devices), portable game machines, portable information terminals, audio reproducing devices, and the like. Moreover, the lithium-ion secondary battery can be provided in electrically propelled vehicles such as electric vehicles, hybrid vehicles, electric railway Oars, service vehicles, carts, and electric wheelchairs. Here, examples of the electrically propelled vehicles will be described.

Figure 5A:
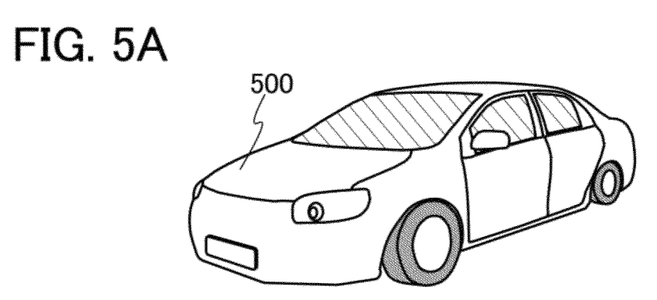
FIGS. 5A and 5B illustrate an application of a lithium-ion secondary battery.
Figure 5B:
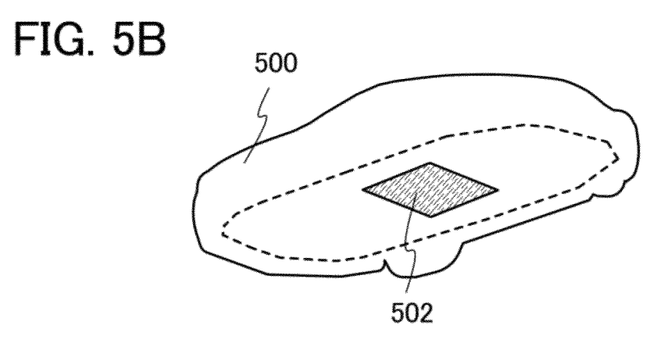

FIG. 5A illustrates a structure of a four-wheeled automobile 500 as an example of the electrically propelled vehicles. The automobile 500 is an electric vehicle or a hybrid vehicle. An example is illustrated in which the automobile 500 is provided with a lithium-ion secondary battery 502 on its bottom portion. In order to clearly show the position of the lithium-ion secondary battery 502 in the automobile 500, FIG. 5B shows the outline of the automobile 500 and the lithium-ion secondary battery 502 provided on the bottom portion of the automobile 500. The lithium-ion secondary battery described in Embodiment 2 can be used as the lithium-ion secondary battery 502. The lithium-ion secondary battery 502 can be charged by being externally supplied with electric power by a plug-in technique or a wireless power feeding system.

Embodiment 4

In this embodiment, examples of using a lithium-ion secondary battery according to one embodiment of the present invention in a wireless power feeding system (hereinafter referred to as an RF power feeding system) will be described with reference to block diagrams in FIG. 6 and FIG. 7. In each of the block diagrams, blocks show elements independently, which are classified according to their functions, within a power receiving device and a power feeding device. However, it is practically difficult to completely separate the elements according to their functions; in some cases, one element can involve a plurality of functions.

First, the RF power feeding system will be described with reference to FIG. 6.

A power receiving device 600 is an electronic device or an electrically propelled vehicle which is driven by electric power supplied from a power feeding device 700, and can be applied to any other devices which are driven by electric power, as appropriate. Typical examples of the electronic device include cameras such as digital cameras or video cameras, digital photo frames, mobile phones, portable game machines, portable information terminals, audio reproducing devices, display devices, computers, and the like. Typical examples of the electrically propelled vehicle include electric vehicles, hybrid vehicles, electric railway cars, service vehicles, carts, electric wheelchairs, and the like. In addition, the power feeding device 700 has a function of supplying electric power to the power receiving device 600.

Figure 6:
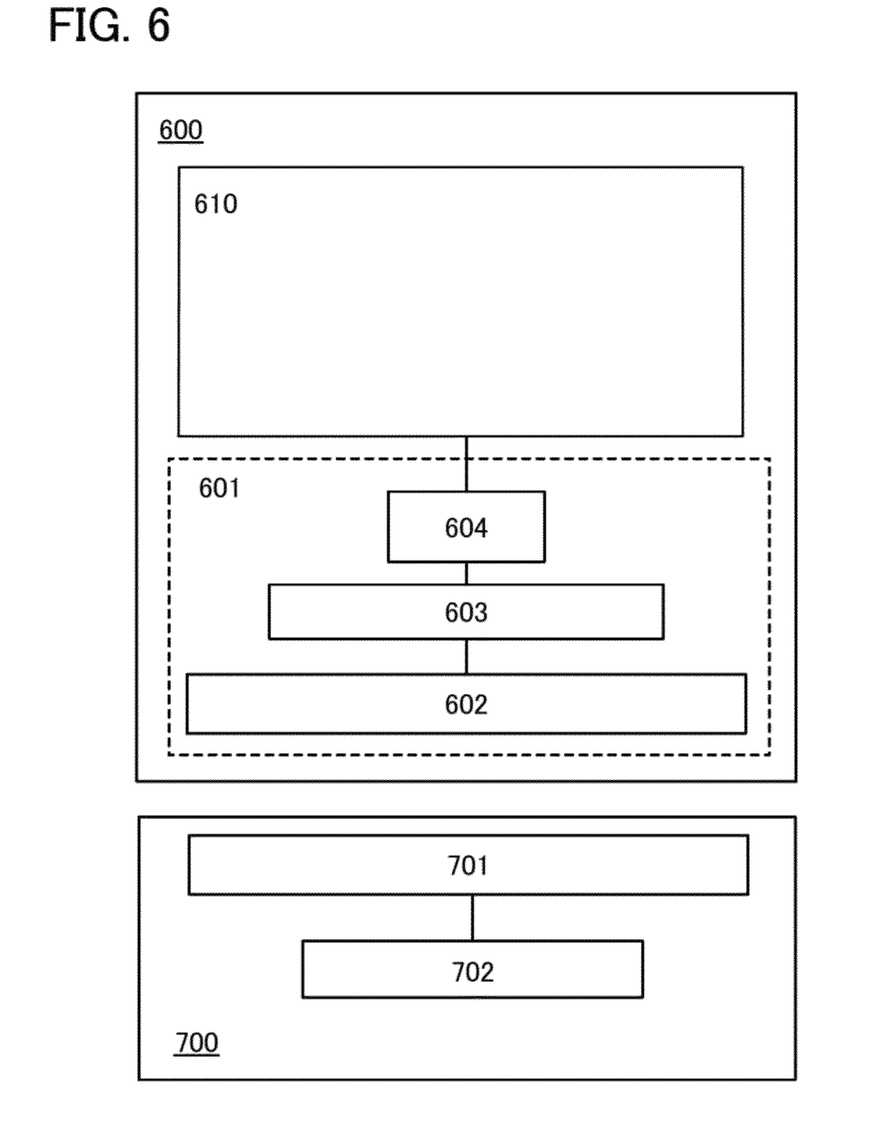
FIG. 6 illustrates an example of a structure of a wireless power feeding system.

In FIG. 6, the power receiving device 600 includes a power receiving device portion 601 and a power load portion 610. The power receiving device portion 601 includes at least a power receiving device antenna circuit 602, a signal processing circuit 603, and a lithium-ion secondary battery 604. The power feeding device 700 includes at least a power feeding device antenna circuit 701 and a signal processing circuit 702.

The power receiving device antenna circuit 602 has a function of receiving a signal transmitted by the power feeding device antenna circuit 701 and a function of transmitting a signal to the power feeding device antenna circuit 701. The signal processing circuit 603 processes a signal received by the power receiving device antenna circuit 602 and controls charging of the lithium-ion secondary battery 604 and supplying of electric power from the lithium-ion secondary battery 604 to the power load portion 610. In addition, the signal processing circuit 603 controls operation of the power receiving device antenna circuit 602. That is, the signal processing circuit 603 can control the intensity, the frequency, or the like of a signal transmitted by the power receiving device antenna circuit 602. The power load portion 610 is a drive portion which receives electric power from the lithium-ion secondary battery 604 and drives the power receiving device 600. Typical examples of the power load portion 610 include a motor, a driver circuit, and the like. Another device which receives electric power and drives the power receiving device may be used as the power load portion 610 as appropriate. The power feeding device antenna circuit 701 has a function of transmitting a signal to the power receiving device antenna circuit 602 and a function of receiving a signal from the power receiving device antenna circuit 602. The signal processing circuit 702 processes a signal received by the power feeding device antenna circuit 701. In addition, the signal processing circuit 702 controls operation of the power feeding device antenna circuit 701. That is, the signal processing circuit 702 can control the intensity, the frequency, or the like of a signal transmitted by the power feeding device antenna circuit 701.

The lithium-ion secondary battery according to one embodiment of the present invention is used as the lithium-ion secondary battery 604 included in the power receiving device 600 in the RF power feeding system shown in FIG. 6.

When the lithium-ion secondary battery according to one embodiment of the present invention is used in the RF power feeding system, the discharge capacity or the charge capacity (also referred to as the amount of power storage) can be increased as compared with the case of using a conventional secondary battery. Therefore, the time interval between wireless power feeding and the next wireless power feeding can be longer (power feeding can be less frequent).

In addition, with the use of the lithium-ion secondary battery according to one embodiment of the present invention in the RF power feeding system, the power receiving device 600 can be compact and lightweight if the discharge capacity or the charge capacity with which the power load portion 610 can be driven is the same as that of a conventional secondary battery. Therefore, the total cost can be reduced.

Next, another example of the RF power feeding system will be described with reference to FIG. 7.

Figure 7:
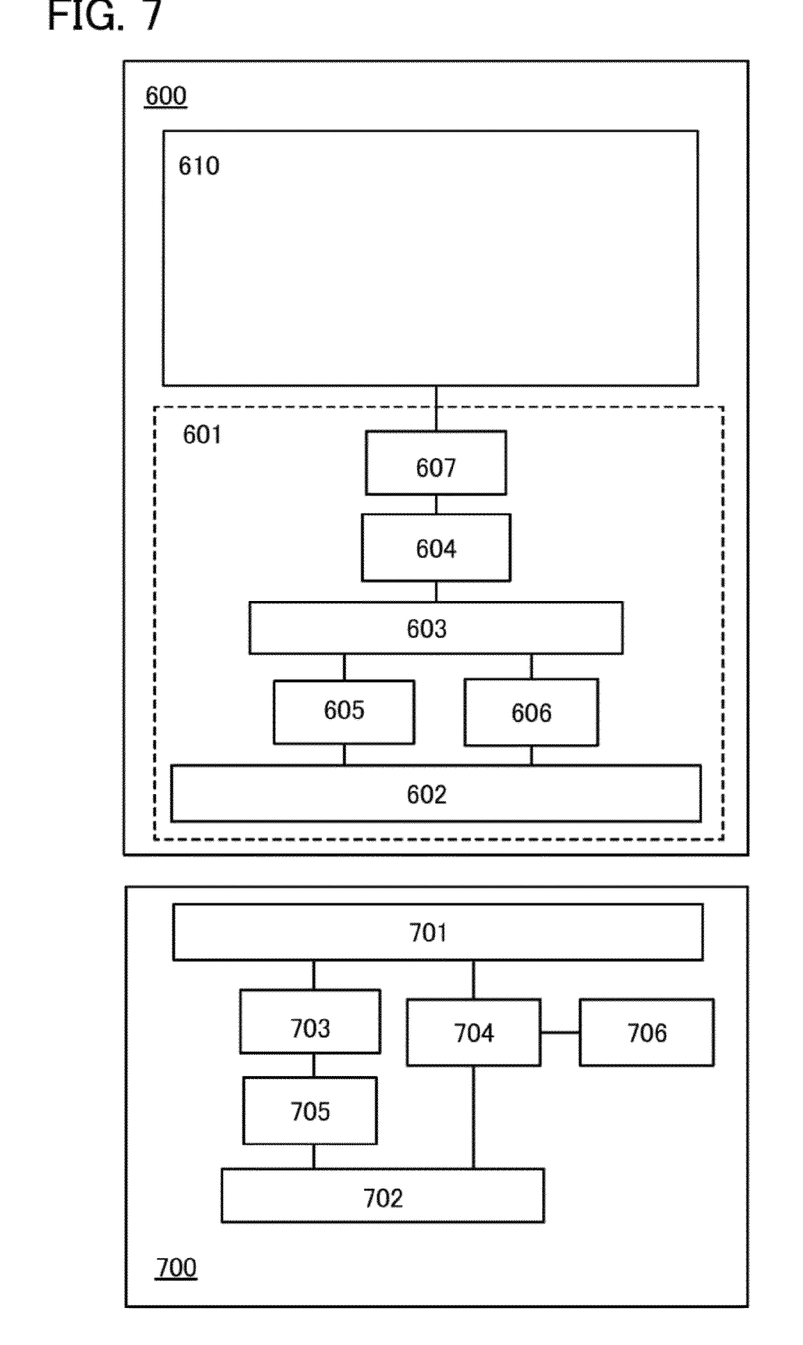
FIG. 7 illustrates an example of a structure of a wireless power feeding system.

In FIG. 7, the power receiving device 600 includes the power receiving device portion 601 and the power load portion 610. The power receiving device portion 601 includes at least the power receiving device antenna circuit 602, the signal processing circuit 603, the lithium-ion secondary battery 604, a rectifier circuit 605, a modulation circuit 606, and a power supply circuit 607. In addition, the power feeding device 700 includes at least the power feeding device antenna circuit 701, the signal processing circuit 702, a rectifier circuit 703, a modulation circuit 704, a demodulation circuit 705, and an oscillator circuit 706.

The power receiving device antenna circuit 602 has a function of receiving a signal transmitted by the power feeding device antenna circuit 701 and a function of transmitting a signal to the power feeding device antenna circuit 701. In the case where the power receiving device antenna circuit 602 receives a signal transmitted by the power feeding device antenna circuit 701, the rectifier circuit 605 generates DC voltage from the signal received by the power receiving device antenna circuit 602. The signal processing circuit 603 has a function of processing a signal received by the power receiving device antenna circuit 602 and a function of controlling charging of the lithium-ion secondary battery 604 and supply of electric power from the lithium-ion secondary battery 604 to the power supply circuit 607. The power supply circuit 607 has a function of converting voltage stored in the lithium-ion secondary battery 604 into voltage needed for the power load portion 610. The modulation circuit 606 is used when a certain response is transmitted from the power receiving device 600 to the power feeding device 700.

With the power supply circuit 607, electric power to be supplied to the power load portion 610 can be controlled. Thus, overvoltage application to the power load portion 610 can be suppressed, leading to suppression of deterioration or breakdown of the power receiving device 600.

In addition, provision of the modulation circuit 606 enables transmission of a signal from the power receiving device 600 to the power feeding device 700. Therefore, when it is judged from the amount of charge of the power receiving device 600 that a certain amount of power is stored, a signal is transmitted from the power receiving device 600 to the power feeding device 700 so that power feeding from the power feeding device 700 to the power receiving device 600 can be stopped. As a result, the lithium-ion secondary battery 604 is not fully charged, so that the number of charge cycles of the lithium-ion secondary battery 604 can be increased.

The power feeding device antenna circuit 701 has a function of transmitting a signal to the power receiving device antenna circuit 602 and a function of receiving a signal from the power receiving device antenna circuit 602. When a signal is transmitted to the power receiving device antenna circuit 602, the signal processing circuit 702 generates a signal to be transmitted to the power receiving device. The oscillator circuit 706 is a circuit which generates a signal with a constant frequency. The modulation circuit 704 has a function of applying voltage to the power feeding device antenna circuit 701 in accordance with the signal generated by the signal processing circuit 702 and the signal with a constant frequency generated by the oscillator circuit 706. Thus, a signal is output from the power feeding device antenna circuit 701. On the other hand, when a signal is received from the power receiving device antenna circuit 602, the rectifier circuit 703 rectifies the received signal. From signals rectified by the rectifier circuit 703, the demodulation circuit 705 extracts a signal transmitted from the power receiving device 600 to the power feeding device 700. The signal processing circuit 702 has a function of analyzing the signal extracted by the demodulation circuit 705.

Note that any circuit may be provided between the circuits as long as the RF power feeding can be performed. For example, after the power receiving device 600 receives a signal and the rectifier circuit 605 generates DC voltage, a circuit such as a DC-DC converter or regulator that is provided in a subsequent stage may generate constant voltage. Thus, overvoltage application to the inside of the power receiving device 600 can be suppressed.

The lithium-ion secondary battery according to one embodiment of the present invention is used as the lithium-ion secondary battery 604 included in the power receiving device 600 in the RF power feeding system shown in FIG. 7.

When the lithium-ion secondary battery according to one embodiment of the present invention is used in the RF power feeding system, the discharge capacity or the charge capacity can be increased as compared with the case of using a conventional secondary battery; therefore, the time interval between wireless power feeding and the next wireless power feeding can be longer (power feeding can be less frequent).

In addition, with the use of the lithium-ion secondary battery according to one embodiment of the present invention in the RF power feeding system, the power receiving device 600 can be compact and lightweight if the discharge capacity or the charge capacity with which the power load portion 610 can be driven is the same as that of a conventional secondary battery. Therefore, the total cost can be reduced.

Note that when the lithium-ion secondary battery according to one embodiment of present invention is used in the RF power feeding system and the power receiving device antenna circuit 602 and the lithium-ion secondary battery 604 overlap with each other, it is preferred that the impedance of the power receiving device antenna circuit 602 is not changed because of deformation of the lithium-ion secondary battery 604 due to charge and discharge of the lithium-ion secondary battery 604 and deformation of an antenna due to the above deformation. If the impedance of the antenna is changed, in some cases, electric power is not supplied sufficiently. For example, the lithium-ion secondary battery 604 may be packed in a battery pack formed of metal or ceramics. Note that in that case, the power receiving device antenna circuit 602 and the battery pack are preferably separated from each other by several tens of micrometers or more.

In this embodiment, the signal for charge has no limitation on its frequency and may have any band of frequency, with which electric power can be transmitted. For example, the signal for charge may have any of an LF band of 135 kHz (long wave), an HF band of 13.56 MHz (short wave), a UHF band of 900 MHz to 1 GHz (ultra high frequency wave), and a microwave band of 2.45 GHz.

A signal transmission method may be properly selected from various methods including an electromagnetic coupling method, an electromagnetic induction method, a resonance method, and a microwave method. In order to prevent energy loss due to foreign substances containing moisture, such as rain and mud, an electromagnetic induction method or a resonance method using a low frequency band, specifically, frequencies of short waves of 3 MHz to 30. MHz, frequencies of medium waves of 300 kHz to 3 MHz, frequencies of long waves of 30 kHz to 300 kHz, or frequencies of ultra long waves of 3 kHz to 30 kHz, is preferably used.

This embodiment can be implemented in combination with any of the above embodiments.

Example 1

In this example, the lithium-containing composite oxide formed according to Embodiment 1 will be described below.

First, a method for forming the lithium-containing composite oxide will be described.

$LiOH.H_2O$, $MnCl_2.4H_2O$, and $NH_4H_2PO_4$ were individually weighed so that the molar ratio of Li:Mn:P was 2:1:1.

Then, $LiOH.H_2O$, $MnCl_2.4H_2O$, and $NH_4H_2PO_4$ were individually dissolved in pure water to form a solution containing Li, a solution containing Mn, and a solution containing P.

The solution containing Li and the solution containing P were mixed little by little while being stirred, so that a mixed solution A was formed.

The mixed solution A was dripped little by little in the solution containing Mn while stirring was performed, so that a mixed solution B was formed.

The mixed solution B was put in a container resistant to heat and pressure and heated at 150° C. for 12 hours, and then the container resistant to heat and pressure was cooled. After that, the resultant solution in the container resistant to heat and pressure was filtrated and washed with water. Subsequently, the solution was dried in a vacuum atmosphere at 60° C. for two hours, so that a resultant solution A was obtained.

Figure 8:
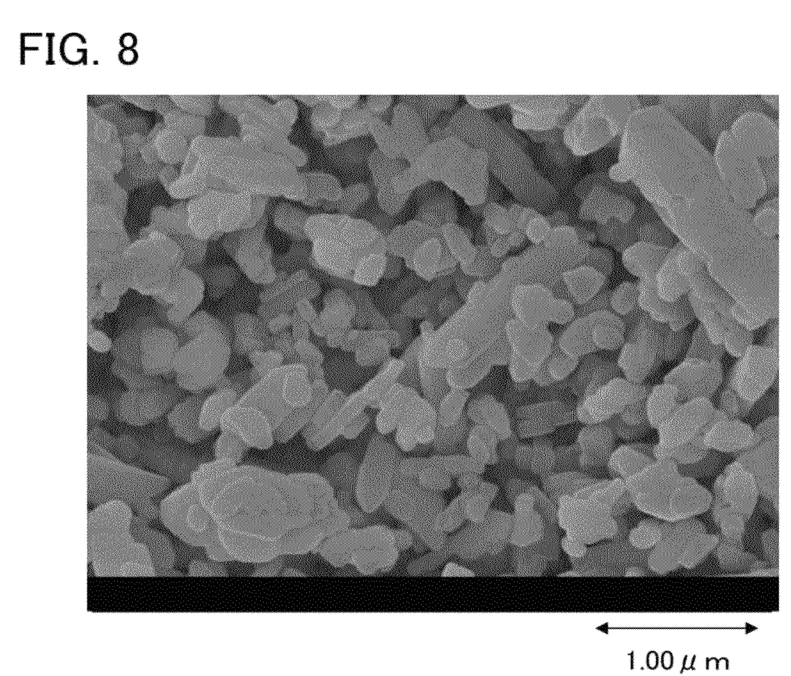
FIG. 8 shows an SEM image.

The resultant solution A was observed with SEM. FIG. 8 shows a SEM image (magnified by 50,000 times). As shown in FIG. 8, flat single crystal particles of lithium manganese Phosphates were obtained.

This application is based on Japanese Patent Application serial no. 2011-060196 filed with the Japan Patent Office on Mar. 18, 2011, the entire contents of which are hereby incorporated by reference.

What is claimed is:

1. A method for manufacturing a lithium-containing composite oxide expressed by a general formula $LiMPO_4$ (M is one or more of Fe (II), Mn (II), Co (II), and Ni (II)), comprising:

forming a solution containing Li and P, the solution containing Li and P being slightly alkaline;

dripping the solution containing Li and P in a solution containing M (M is one or more of Fe (II), Mn (II), Co (II), and Ni (II)) while stirring the solution containing M to form a mixed solution; and performing a hydrothermal method using the mixed solution so that the lithium-containing composite oxide expressed by the general formula $LiMPO_4$ (M is one or more of Fe (II), Mn (II), Co (II), and Ni (II)) is formed.

2. The method for manufacturing a lithium-containing composite oxide, according to claim 1, wherein concentrations of the solution containing Li and P, and the solution containing M (M is one or more of Fe (II), Mn (II), Co (II), and Ni (II)) are controlled so that a pH of the mixed solution becomes 6 to 8.

3. The method for manufacturing a lithium-containing composite oxide, according to claim 2, wherein the pH of the mixed solution becomes 7.

4. The method for manufacturing a lithium-containing composite oxide, according to claim 1, wherein the lithium-containing composite oxide has an olivine structure.

5. The method for manufacturing a lithium-containing composite oxide, according to claim 1, wherein the lithium-containing composite oxide is a flat shape.

6. The method for manufacturing a lithium-containing composite oxide, according to claim 1, wherein the step of dripping the solution containing Li and P is performed at a temperature in a range of a room temperature to 50° C.

7. A method for manufacturing a lithium-containing composite oxide expressed by a general formula $LiMPO_4$ (M is one or more of Fe (II), Mn (II), Co (II), and Ni (II)), comprising:

forming a first solution in which a lithium compound is dissolved;

forming a second solution in which a phosphorus compound is dissolved;

forming a third solution in which one or more of an iron (II) compound, a manganese (II) compound, a cobalt (II) compound, and a nickel (II) compound are dissolved;

forming a first mixed solution by mixing the first solution and the second solution, the first mixed solution being slightly alkaline;

forming a second mixed solution by dripping the first mixed solution in the third solution while stirring the third solution; and forming single crystal particles of a lithium-containing composite oxide by heating the second mixed solution using a hydrothermal method.

8. The method for manufacturing a lithium-containing composite oxide, according to claim 7, wherein concentrations of the first mixed solution and the third solution are controlled so that a pH of the second mixed solution becomes 6 to 8.

9. The method for manufacturing a lithium-containing composite oxide, according to claim 8, wherein the pH of the second mixed solution becomes 7.

10. The method for manufacturing a lithium-containing composite oxide, according to claim 7, wherein the lithium-containing composite oxide has an olivine structure.

11. The method for manufacturing a lithium-containing composite oxide, according to claim 7, wherein the lithium compound is selected from the group consisting of lithium hydroxide-hydrate ($LiOH.H_2O$), lithium chloride (LiCl), lithium carbonate ($Li_2CO_3$), lithium acetate ($LiCH_3COO$), and lithium oxalate (($COOLi)_2$).

12. The method for manufacturing a lithium-containing composite oxide, according to claim 7, wherein the phosphorus compound is one of a phosphoric acid and an ammonium hydrogenphosphate.

13. The method for manufacturing a lithium-containing composite oxide, according to claim 12, wherein the phosphoric acid is orthophosphoric acid ($H_3PO_4$).

14. The method for manufacturing a lithium-containing composite oxide, according to claim 12, wherein the ammonium hydrogenphosphate is one of diammonium hydrogenphosphate (($NH_4$)$_2HPO_4$) And ammonium dihydrogenphosphate ($NH_4H_2PO_4$).

15. The method for manufacturing a lithium-containing composite oxide, according to claim 7, wherein the iron (II) compound is selected from the group consisting of iron chloride ($FeCl_2$), iron sulfate heptahydrate ($FeSO_4.7H_2O$), and iron acetate ($Fe(CH_3COO)_2$).

16. The method for manufacturing a lithium-containing composite oxide, according to claim 7, wherein the manganese (II) compound is selected from the group consisting of manganese chloride tetrahydrate ($MnCl_2.4H_2O$), manganese sulfate-hydrate ($MnSO_4.H_2O$), and manganese acetate tetrahydrate ($Mn(CH_3COO)_2.4H_2O$).

17. The method for manufacturing a lithium-containing composite oxide, according to claim 7, wherein the cobalt (II) compound is selected from the group consisting of cobalt chloride hexahydrate ($CoCl_2.6H_2O$), cobalt sulfate ($CoSO_4$), and cobalt acetate tetrahydrate ($Co(CH_3COO)_2.4H_2O$).

18. The method for manufacturing a lithium-containing composite oxide, according to claim 7, wherein the nickel (II) compound is selected from the group consisting of nickel chloride hexahydrate ($NiCl_2.6H_2O$), nickel sulfate hexahydrate ($NiSO_4.6H_2O$), and nickel acetate tetrahydrate ($Ni(CH_3COO)_2.4H_2O$).

19. The method for manufacturing a lithium-containing composite oxide, according to claim 7, wherein the lithium-containing composite oxide is a flat shape.

20. The method for manufacturing a lithium-containing composite oxide, according to claim 7, wherein the step of dripping the first mixed solution is performed at a temperature in a range of a room temperature to 50° C.

21. A method for manufacturing an electrode, comprising:
forming a solution containing Li and P, the solution containing Li and P being slightly alkaline;
dripping the solution containing Li and P in a solution containing M (M is one or more of Fe (II), Mn (II), Co (II), and Ni (II)) while stirring the solution containing M to form a mixed solution;
performing a hydrothermal method using the mixed solution so that the lithium-containing composite oxide expressed by the general formula $LiMPO_4$ (M is one or more of Fe (II), Mn (II), Co (II), and Ni (II)) is formed; and
forming a positive electrode using the lithium-containing composite oxide.

22. The method for manufacturing an electrode, according to claim 21, wherein concentrations of the solution containing Li and P, and the solution containing M (M is one or more of Fe (II), Mn (II), Co (II), and Ni (II)) Are controlled so that a pH of the mixed solution becomes 6 to 8.

23. The method for manufacturing an electrode, according to claim 22, wherein the pH of the mixed solution becomes 7.

24. The method for manufacturing an electrode, according to claim 21, wherein the lithium-containing composite oxide has an olivine structure.

25. The method for manufacturing an electrode, according to claim 21, wherein the lithium-containing composite oxide is a flat shape.

26. The method for manufacturing an electrode, according to claim 21, wherein the step of dripping the solution containing Li and P is performed at a temperature in a range of a room temperature to 50° C.

27. A method for manufacturing an electrode, comprising:
forming a first solution in which a lithium compound is dissolved;
forming a second solution in which a phosphorus compound is dissolved;
forming a third solution in which one or more of an iron (II) compound, a manganese (II) compound, a cobalt (II) compound, and a nickel (II) compound are dissolved;
forming a first mixed solution by mixing the first solution and the second solution, the first mixed solution being slightly alkaline;
forming a second mixed solution by dripping the first mixed solution in the third solution while stirring the third solution;
forming single crystal particles of a lithium-containing composite oxide by heating the second mixed solution using a hydrothermal method; and
forming a positive electrode using the lithium-containing composite oxide.

28. The method for manufacturing an electrode, according to claim 27, wherein concentrations of the first mixed solution and the third solution are controlled so that a pH of the second mixed solution becomes 6 to 8.

29. The method for manufacturing an electrode, according to claim 28, where the pH of the second mixed solution becomes 7.

30. The method for manufacturing an electrode, according to claim 27, wherein the lithium-containing composite oxide has an olivine structure.

31. The method for manufacturing an electrode, according to claim 27, wherein the lithium compound is selected from the group consisting of lithium hydroxide-hydrate ($LiOH.H_2O$), lithium chloride ($LiCl$), lithium carbonate ($Li_2CO_3$), lithium acetate ($LiCH_3COO$), and lithium oxalate (($COOLi)_2$).

32. The method for manufacturing an electrode, according to claim 27, wherein the phosphorus compound is one of a phosphoric acid and an ammonium hydrogenphosphate.

33. The method for manufacturing an electrode, according to claim 32, wherein the phosphoric acid is orthophosphoric acid ($H_3PO_4$).

34. The method for manufacturing an electrode, according to claim 32, wherein the ammonium hydrogenphosphate is one of diammonium hydrogenphosphate (($NH_4$)$_2HPO_4$) And ammonium dihydrogenphosphate ($NH_4H_2PO_4$).

35. The method for manufacturing an electrode, according to claim 27, wherein the iron (II) compound is selected from the group consisting of iron chloride ($FeCl_2$), iron sulfate heptahydrate ($FeSO_4.7H_2O$), and iron acetate ($Fe(CH_3COO)_2$).

36. The method for manufacturing an electrode, according to claim 27, wherein the manganese (II) compound is selected from the group consisting of manganese chloride tetrahydrate ($MnCl_2.4_2O$), manganese sulfate-hydrate ($MnSO_4.H_2O$), and manganese acetate tetrahydrate ($Mn(CH_3COO)_2.4H_2O$).

37. The method for manufacturing an electrode, according to claim 27, wherein the cobalt (II) compound is selected from the group consisting of cobalt chloride hexahydrate ($CoCl_2.6H_2O$), cobalt sulfate ($CoSO_4$), and cobalt acetate tetrahydrate ($Co(CH_3COO)_2. 4H_2O$).

38. The method for manufacturing an electrode, according to claim 27, wherein the nickel (II) compound is selected from the group consisting of nickel chloride hexahydrate ($NiCl_2.6H_2O$), nickel sulfate hexahydrate ($NiSO_4.6H_2O$), and nickel acetate tetrahydrate ($Ni(CH_3COO)_2.4H_2O$).

39. The method for manufacturing an electrode, according to claim 27, wherein the lithium-containing composite oxide is a flat shape.

40. The method for manufacturing an electrode, according to claim 27, wherein the step of dripping the first mixed solution is performed at a temperature in a range of a room temperature to 50° C.

* * * * *